Nov. 17, 1936.  J. H. ADAIR  2,061,298

HIGHWAY RAIL VEHICLE

Filed Oct. 13, 1933  8 Sheets-Sheet 1

INVENTOR.
John Hugh Adair

Nov. 17, 1936.  J. H. ADAIR  2,061,298
HIGHWAY RAIL VEHICLE
Filed Oct. 13, 1933  8 Sheets-Sheet 2
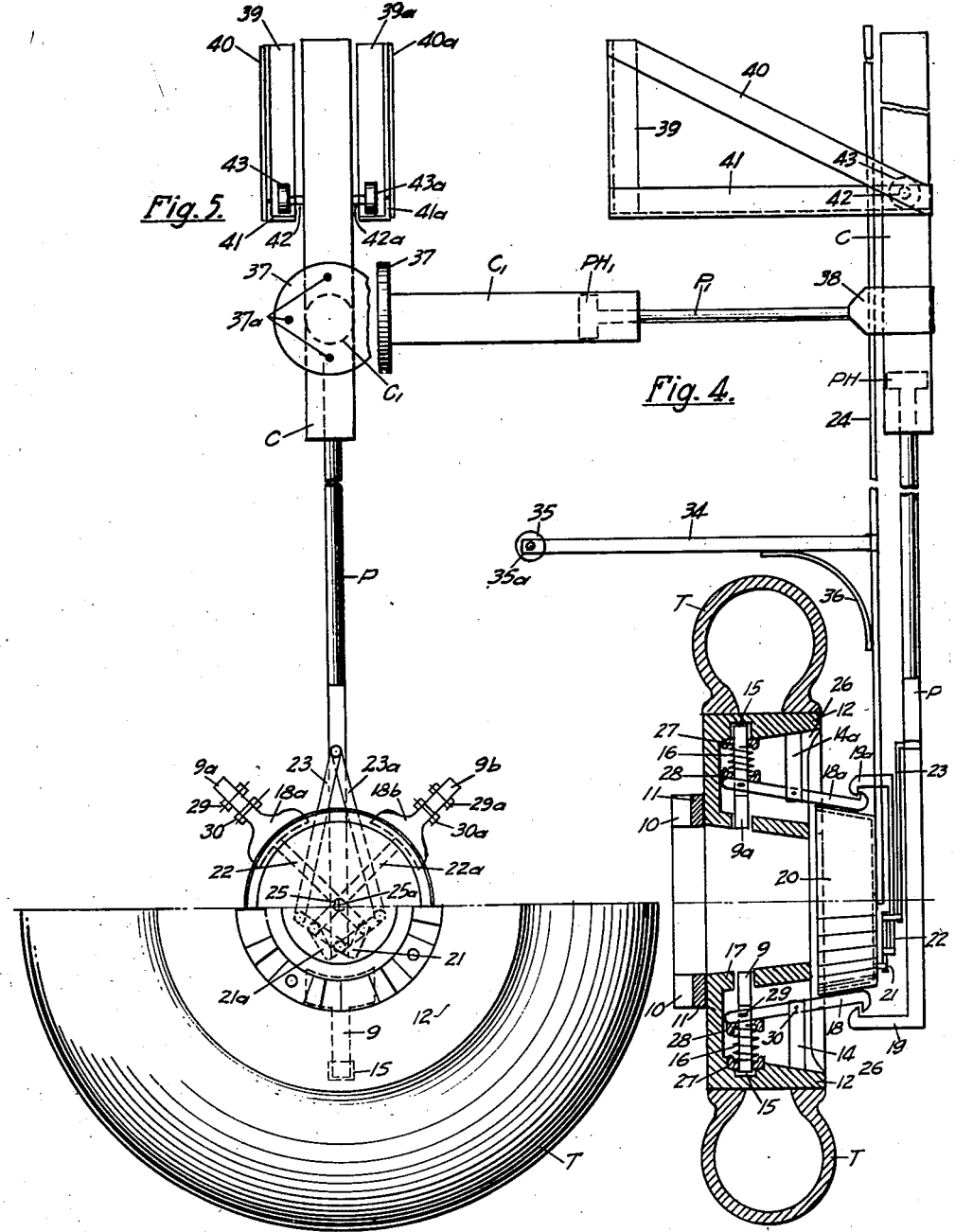
INVENTOR.
John Hugh Adair

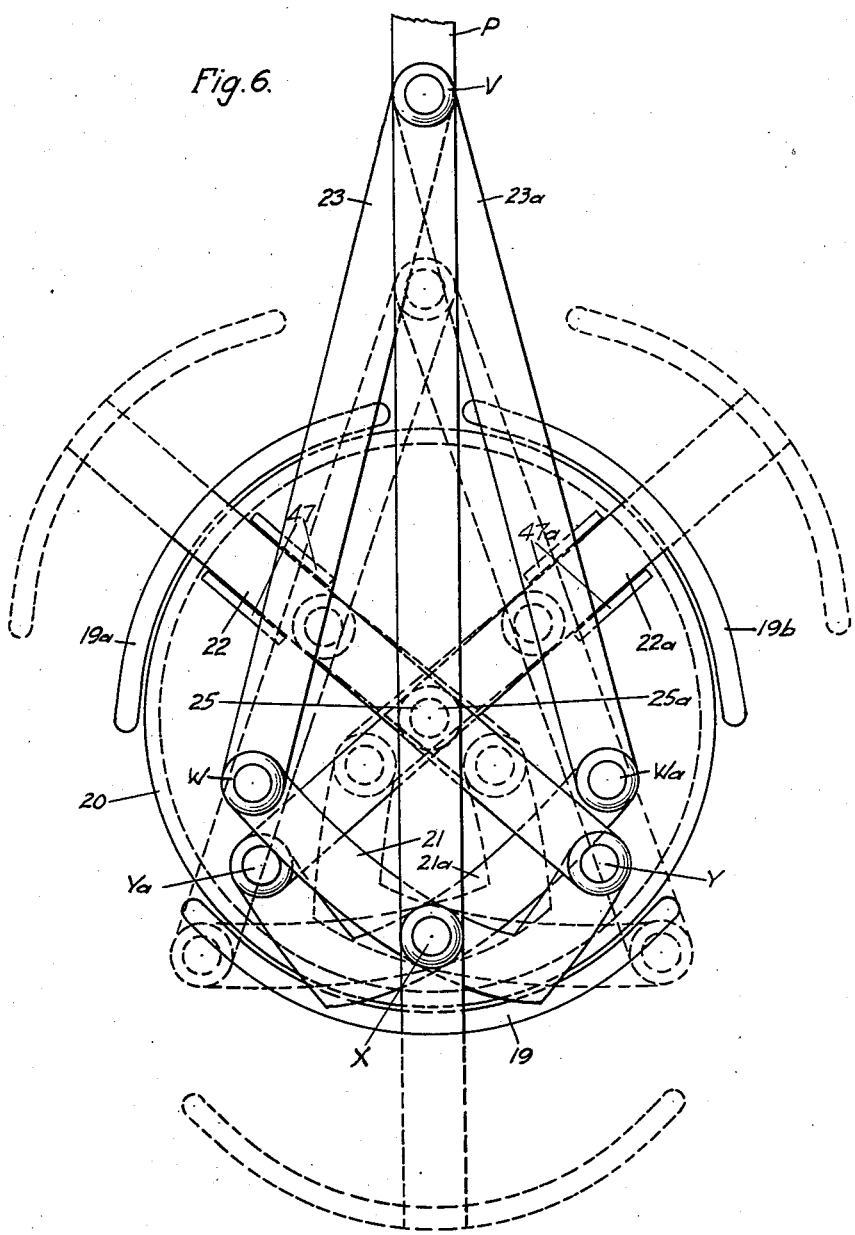

Nov. 17, 1936.    J. H. ADAIR    2,061,298
HIGHWAY RAIL VEHICLE
Filed Oct. 13, 1933    8 Sheets-Sheet 4

INVENTOR.
John Hugh Adair

Nov. 17, 1936.   J. H. ADAIR   2,061,298
HIGHWAY RAIL VEHICLE
Filed Oct. 13, 1933   8 Sheets-Sheet 5

INVENTOR.
John Hugh Adair

Nov. 17, 1936.  J. H. ADAIR  2,061,298
HIGHWAY RAIL VEHICLE
Filed Oct. 13, 1933  8 Sheets-Sheet 7
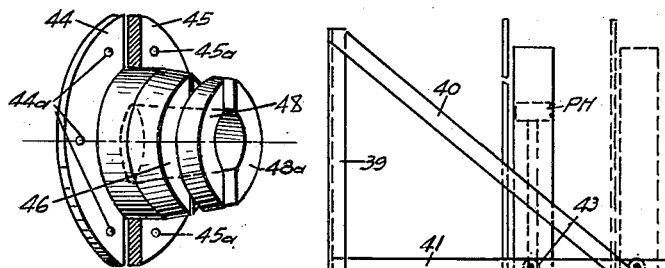
Fig. 11.
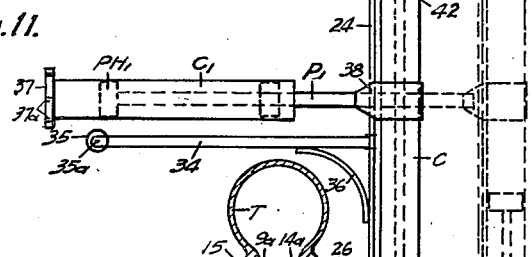
Fig. 12.
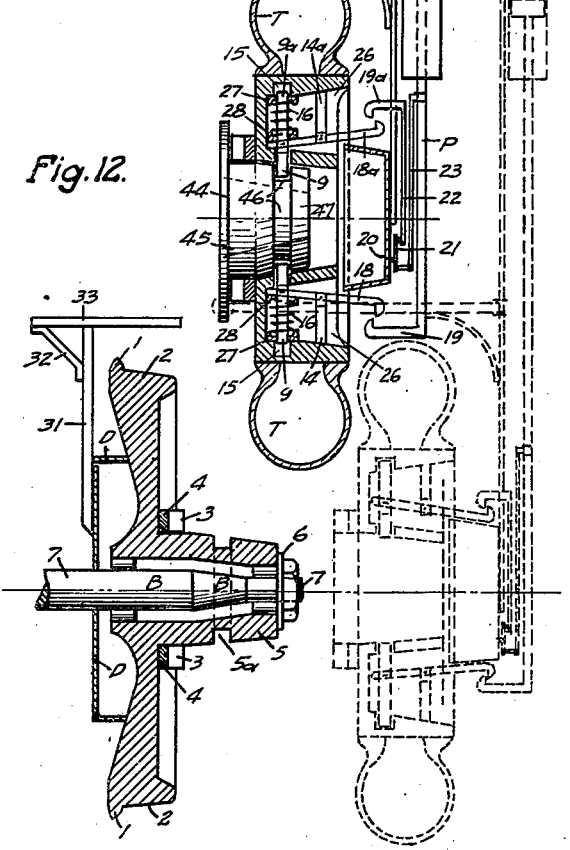
INVENTOR.
John Hugh Adair Nov. 17, 1936. J. H. ADAIR 2,061,298
HIGHWAY RAIL VEHICLE
Filed Oct. 13, 1933 8 Sheets-Sheet 8
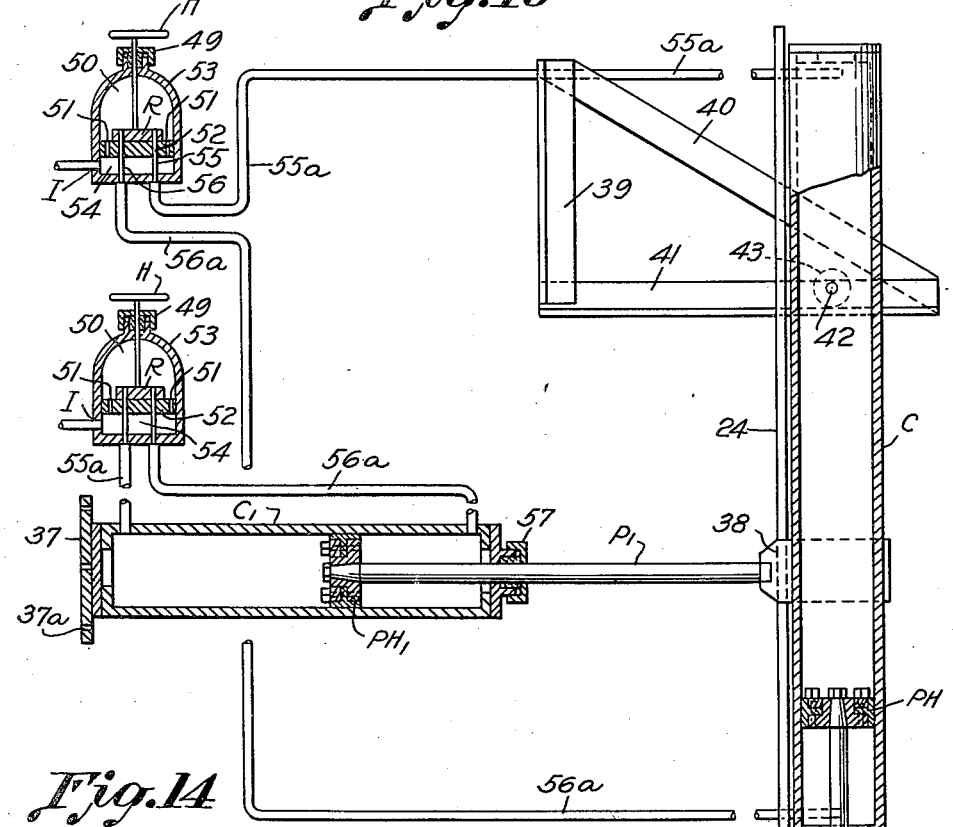
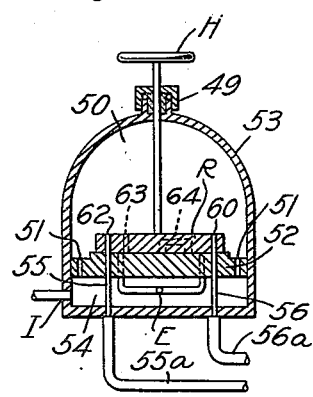
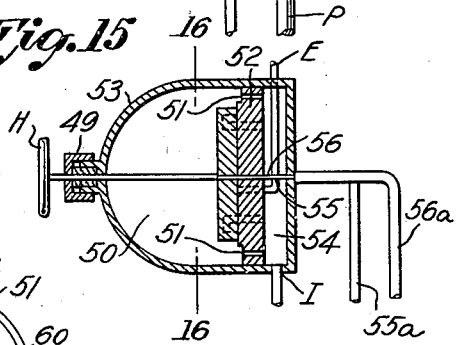
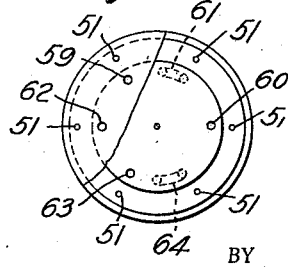
INVENTOR.
John Hugh Adair,
BY George Hindman
ATTORNEY.

Patented Nov. 17, 1936

2,061,298

UNITED STATES PATENT OFFICE 2,061,298

HIGHWAY-RAIL VEHICLE

John Hugh Adair, Amarillo, Tex.

Application October 13, 1933, Serial No. 693,469

16 Claims. (Cl. 105—215)

My invention relates to the running gear or wheel structure of a vehicle whereby the latter is adapted to run on the present type of railroad tracks and within a brief period of time adapted to travel on highways or streets; the invention contemplating means whereby a speedy and easy conversion from the railroad track wheel to the highway rubber tired wheel may be mechanically or hydraulically accomplished.

The object of my invention is to provide a suitable vehicle or truck with track or flanged wheels, secured to the axles and one of the latter provided with the usual geared differential drive; the track or flanged wheels being adapted to have highway or rubber tired wheels quickly applied thereto; the wheels on the other axles being controllable by steering mechanism as usual with highway trucks or motor driven vehicles.

The purpose of my invention is to provide a truck with my improved wheel structure and control mechanism which will enable a railroad to provide a commodity or merchandise pick-up and delivery service comparable to that furnished by the highway motor truck and in certain respects superior thereto.

The objects and advantages of my invention will be readily comprehended from the following description of the accompanying drawings wherein.

Figures 3, 3A:
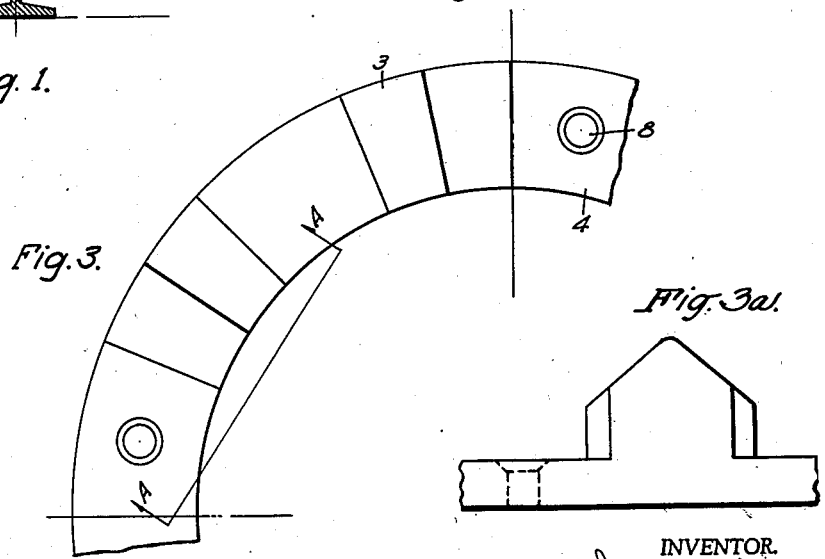
Figure 3 is a side elevation of a segmental portion of the toothed gear secured to the outer side of the track wheel.

Figure 3ª is a detail view of a gear tooth in side elevation as viewed on the line A—A of Figure 3.

Figure 4 is a sectional elevation of my improved truck or rubber-tired wheel and control mechanism.

Figure 5 is a side elevation as viewed from the left in Figure 4, with the upper half of the wheel broken away.

Figure 6 is a side elevation of the controlling or lever mechanism as viewed from the right of Figure 4; the upper portion being broken away and the inoperative position of the mechanism shown in dotted lines.

Figure 7:
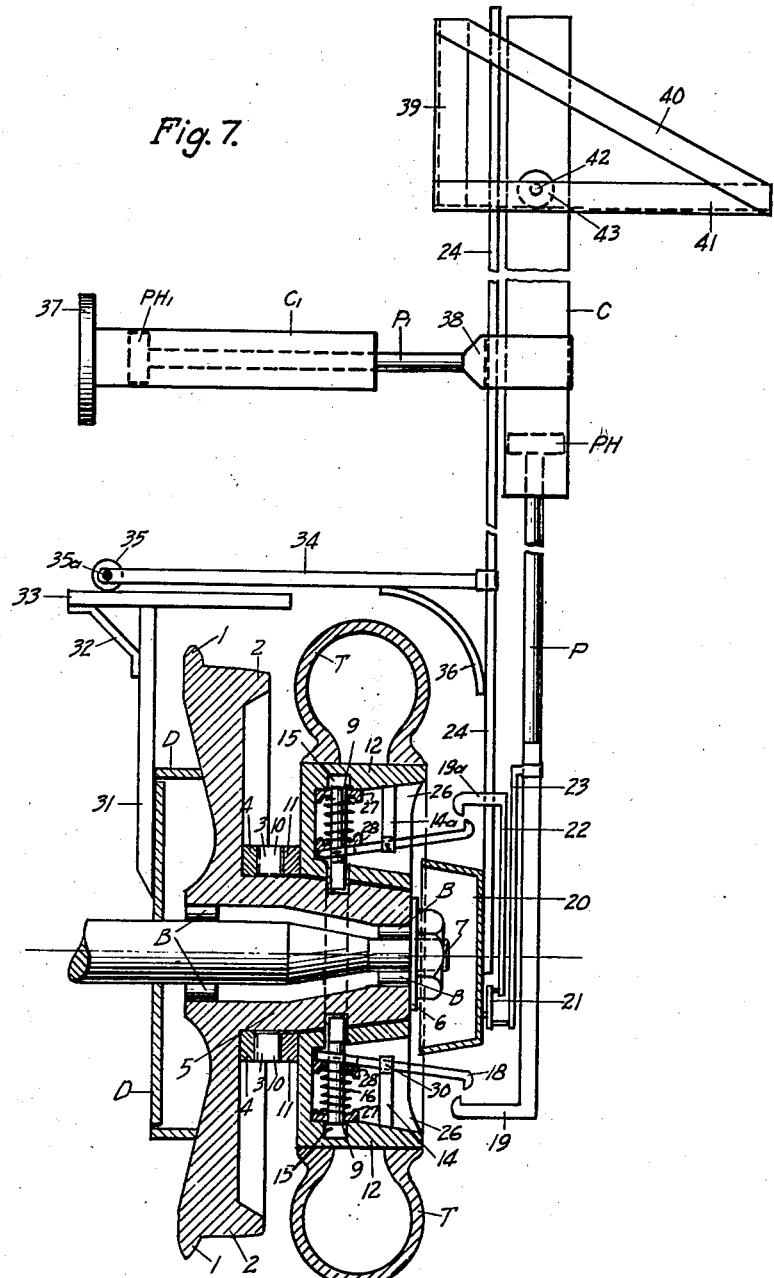

Figure 7 is a sectional view of both track and highway wheels in interlocked position and the controlling mechanism in released position; a portion of said control mechanism being in elevation.

Figure 8:
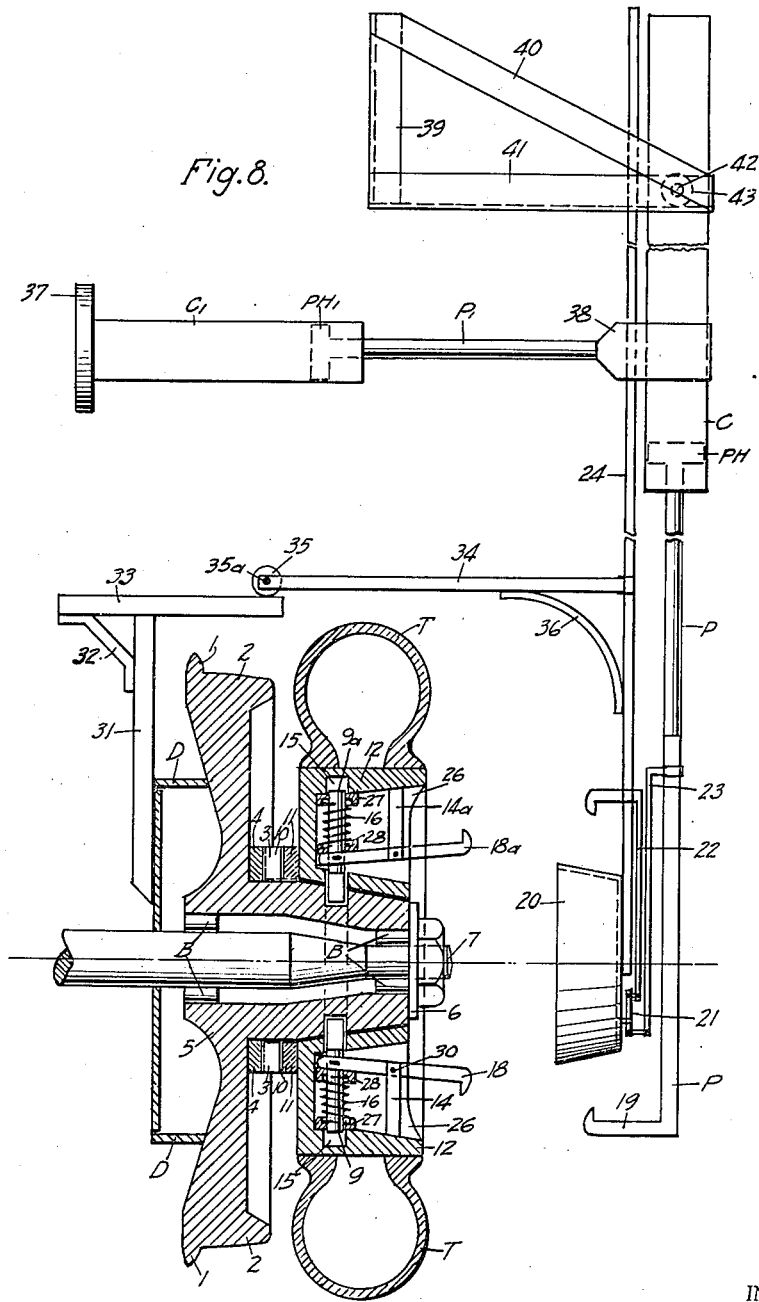

Figure 8 is a similar view with the controlling mechanism in its inoperative position; the figure also illustrating means whereby to gauge the aligning position of the highway wheel with the track wheel during applying operation.

Figure 9:
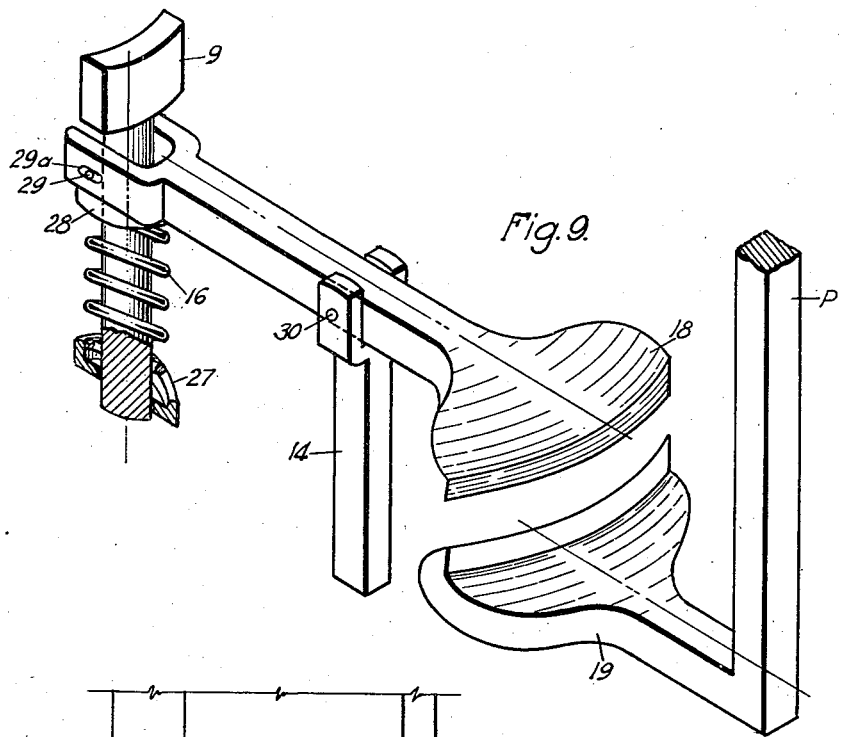

Figure 9 is a detail perspective view of a portion of the track and highway wheel interlocking means and a portion of the controlling mechanism.

Figure 10:
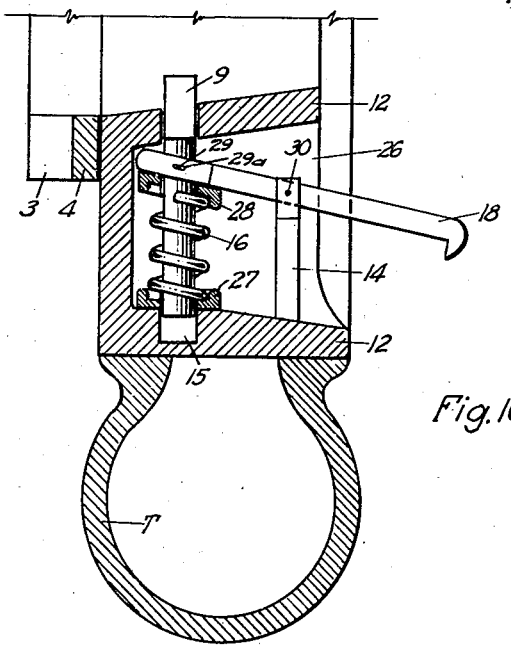

Figure 10 is a sectional view of the lower portion of the highway wheel hub as shown in Figure 8, with the track-wheel omitted.

Figure 11 is a perspective view of one of the dummy drums for holding a disconnected highway wheel.

Figure 12 is an assembly of one wheel and wheel control unit more or less schematically illustrated; a highway wheel being mounted on a dummy drum, the wheel and a portion of the control mechanism, as well as the track wheel being shown in section, while the highway wheel applying position of the control mechanism is shown in dotted lines.

Figure 13 schematically illustrates the cylinder arrangement and valve mechanism; certain portions being in section.

Figure 14 is a detail sectional view of one of the pressure medium control valves.

Figure 15 is a similar view illustrating a different position of the rotatable disc valve.

Figure 16 is a view substantially taken on the line 16—16 of Figure 15.

My invention has for its object the provision of a running gear or wheel structure whereby a suitable vehicle or truck, which preferably has its own motive power, may employ the tracks of a railroad in the transportation of merchandise and the same vehicle or truck, upon arrival at its terminal or station, employ the highways or municipal streets in its pick-up and delivery service; the transition from a railroad or track vehicle to a highway vehicle, and vice versa, being quickly accomplished through operation of mechanism, secured to the truck and actuated by the motive power of the vehicle.

As the truck or vehicle body generally may be of any suitable construction and conventional type, illustration and description of the vehicle proper are not deemed necessary; the vehicle or truck being preferably driven by its own motive power, with the usual transmission mechanism, steering mechanism and differential mechanism intermediate of the drive shaft and rear wheel axles.

Figures 1, 2:
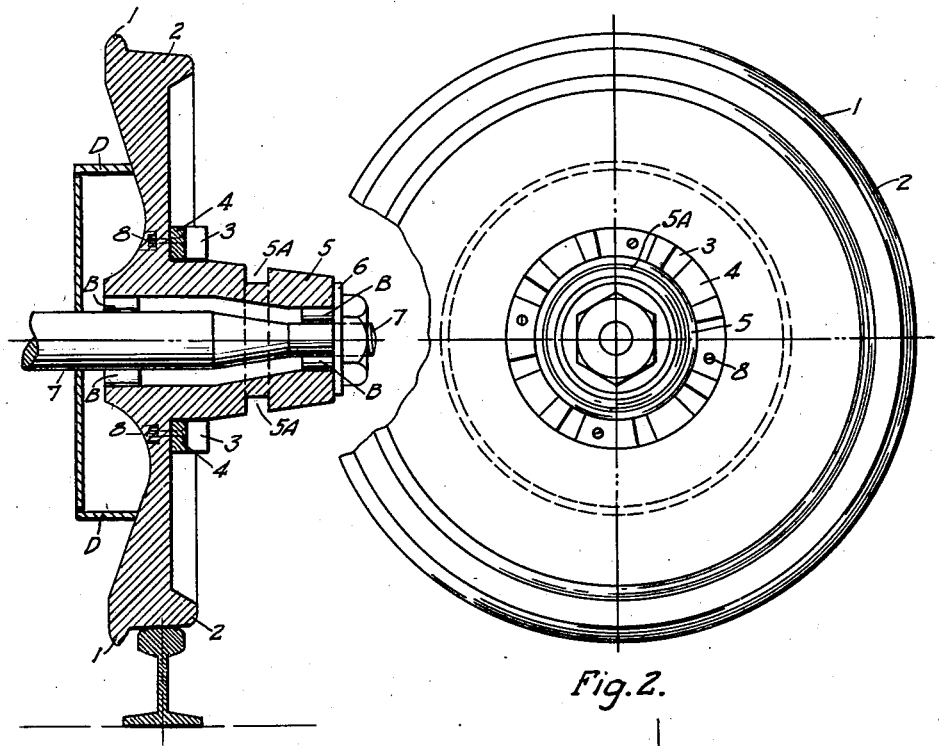
Figure 1 is a sectional view of my improved track wheel and mounting with a portion of one of the axles shown in full lines.
Figure 2 is an outside elevation of the wheel, with a portion broken away.

My invention relates to the running gear or wheels and as the construction and arrangement of all the wheels are identical, merely one wheel, namely a front wheel on the right hand side, and its correlated controlling mechanisms have been shown and will be described. Figure 1 illustrates my improved mechanism for use on a railroad track through the use of a railroad wheel provided with the usual flange or wheel guard 1 and tread 2.

The outer sides of the wheel are provided with a gear ring 4 having suitable teeth 3; the gear-ring 4 being preferably removably secured to the wheel, as by means of bolts as at 8, to permit easy removal in the event of repairs. The wheel is provided with an extended hub 5 on its outer and gear carrying side; the extended hub 5 being provided with a slot 5A.

D represents the brake drum preferably operatively associated with the wheel. The wheels are mounted on proper axles as at 7, and those constituting the driving wheels must be non-rotatably secured to the driving axles so as to revolve therewith; or suitable power transmitting mechanism may be directly associated with certain wheels; but as this part of the mechanism forms no part of my invention, and as it may be of any of the well known types, it has not been illustrated.

The track wheel 1, 2 is intended to remain in place on the axle 7 and therefore the outer end of the axle is shown provided with a suitable nut and lock washer as at 6.

The extended hub 5 is intended to receive a highway wheel when the truck has reached the end of its track run or point where the truck is to be used on the highway.

The highway wheel and the controlling mechanism are shown in Figures 4 and 5; the wheel 12 being shown provided with a pneumatic tire as at T. The tire may be of the conventional type and be secured on wheel 12 in any of the well known methods employed and the more or less schematic illustration is believed ample as the method of securing the tire on the wheel plays no part in my invention.

The wheel 12, on what constitutes the truck side, is provided with a ring gear 11, substantially similar to gear 4 and the teeth 10 of gear 11 are intended to mesh with the teeth 3 of gear 4 when the highway wheel 12 has been put into place on the extended hub 5 of the track wheel. The hub of the wheel 12 is shown internally tapered to correspond with and to receive the extended hub 5 of the track wheel shown in Figure 1.

The highway wheel 12 is provided with a suitable number of radially disposed pins as at 9 and 9a (see Figure 4) arranged intermediate of the rim and the hub of the wheel; the hub being provided with openings therethrough, into which the inner ends of the pins extend; the pins being freely movable through their respective openings, as clearly shown in Figure 10.

These pins 9, 9a are preferably longer than the distance between the hub and the rim portion of the wheels 12 in order that they may at all times have positive sliding relation with the hub and rim of the wheel. The rim, at points coincident with the outer ends of the pins 9, 9a, is provided with a recess or continuous slot, as shown at 15 in Figures 4 and 10, into which the pins may be depressed. The depth of the slot 15 is such that the inner ends of the pins 9, 9a may be completely retracted into the hub wall as shown in Figure 4. The pins 9, 9a are of similar construction, namely the construction more clearly shown in Figure 10 and are normally forced radially inward by coil springs 16; a coil spring 16 being disposed about each pin with the ends of the spring preferably seated on washers 27 and 28.

Each pin is controlled by a pivoted lever which is adapted to force the pin toward the wheel rim against the action of the spring. That is to say, pin 9 is controlled by lever 18, while pin 9a is controlled by lever 18a, and as these elements in each instance are similar, the description of one, for example pin 9 and lever 18, shown in Figure 10, will suffice. The lever 18 is shown bifurcated and yieldingly connected at one end to the pin 9 (see Figure 9); the spring 16 being arranged under compression intermediate of the lever 18 and the rim of the wheel so as to normally tend to force the end of the pin into the bore of the hub of wheel 12, as shown in Figure 10.

The lever 18 is pivotally mounted intermediate of its ends, as at 30 on a portion of wheel 12, or on a suitable post 14 fixedly secured to the wheel. If desired, the levers 18, 18a may be pivotally secured to the reenforcing webs disposed between hub and rim of the wheel and shown at 26.

The free ends of the levers 18, 18a extend a predetermined distance beyond the outer side of the wheel 12, with the outer ends preferably flared or enlarged as shown more clearly in Figure 9.

The pins 9, 9a, as shown in Figures 7 and 10, are intended to enter the grooves 5A in the extended hubs of the rail or track wheels 1, 2; the pins constituting the means whereby the two wheels, namely the track wheel and the highway wheel, are held in operative relation with their gears 3—4 and 10—11 in meshing engagement and power from the track wheels 1, 2, transmitted to the highway or rubber-tired wheels 12.

A suitable number of the wheel locking pins and their controlling levers are employed, and these pins and levers preferably arranged equal distances apart circumferentially about the hubs of the highway wheels 12.

To permit proper use of the trucks on railroad rails or tracks as at present in use and at the same time enable operation at high speed, it is essential to provide the truck with the rail-wheels as described and to provide the separate wheels adapted for highway or street use.

In view of road crossings, switches, frogs and other appurtenances adjacent to the tracks, it is necessary to have the highway wheels quickly removable. It is also essential to provide means whereby the removal and re-application of these highway wheels can be mechanically or hydraulically accomplished without undue effort on the part of the operator; namely through the use of mechanism operable from the driver's cab and whereby the mounting and demounting of the wheels may be accomplished in a very brief period of time, without need of manual labor; the mechanism being intended to be operated by power derived from the truck operating mechanism.

As any suitable power medium may be employed for operating the wheel mounting and demounting mechanism, I merely make a more or less schematic illustration of a pair of cylinders which may be either hydraulic or pneumatic; the pin-lever control mechanism being shown controlled by cylinder C provided with piston P; while the wheel applying and withdrawing mechanism is controlled by cylinder C1 provided with piston P1 (see Figures 4, 7 and 8); the cylinder C to be suitably mounted so it, with the piston, may be laterally shifted toward the truck axles as shown in Figures 4 and 7, or away from the truck axles, as shown in Figure 8.

The piston P is provided with an extension which terminates in an angularly disposed portion or lever 19 which preferably terminates in the laterally enlarged hook-shape end as shown in Figure 9.

This lever portion 19 is intended to engage with the laterally enlarged and somewhat hook-shape end of the pin controlling lever 18, see Figure 9. It will be understood that the free ends of the levers 18 and 18ª are similar in construction, the hook ends being disposed radially outward; while the outer or hook-end of lever 19 (and corresponding levers later referred to) is to extend in a direction opposite to that of lever 18 so as to form interlocking engagement therewith when the control mechanism is actuated and moved into proper position.

Piston P1, of cylinder C1, slidably holds a vertically disposed extension or rod 24 of predetermined length and this rod has a drum member 20 secured thereto. This drum member provides means for mounting levers 22 and 22ª, whereby the hook-shaped levers 19ª and 19ᵇ are controlled and which latter mentioned levers, like lever 19, are each adapted to engage with a pin controlling lever 18ª when piston P has been properly actuated.

Pivotally secured at V on piston P is link 23 whose lower end is pivotally secured at W to one end of bell-crank lever 21 which is pivoted at X on the rear of the drum; the other end of lever 21 being pivotally secured at Y to lever 22 which is secured to one end of lever 19ª; the inoperative positions of the wheel releasing and holding levers being shown in dotted lines in Figure 6, while the operative and wheel holding positions of the levers 19, 19ª, 19ᵇ are shown in full lines in close proximity to the perimeter of the drum 20.

The drum 20 also provides a stop for the radial movement of the pin releasing levers 18, 18ª and prevents the bending of the latter in the event of too much pressure being applied to piston P. Piston P simultaneously operates the levers 19, 19ª and 19ᵇ and causes the latter and levers 18, 18ª to be drawn toward each other and therefore toward the drum. Furthermore, the drum 20 acts as a reenforcement for the outer ends of the levers 18, 18ª, which, together with levers 19, 19ª and 19ᵇ carry the wheel 12 when it is detached from the hub of the track wheel; that is to say, levers 18, 18ª and 19, 19ª and 19ᵇ are intended to hold the wheel 12 in suspended position after it has been detached from the track wheel, as shown in Figure 4, at least during application and withdrawal operations.

It will be understood that similar wheel controlling mechanism is arranged for each wheel in any suitable manner on the truck and the respective cylinders would have communication with any suitable supply of air or fluid under pressure arranged at the control of the driver. The object of the invention is that the wheel changing operation is to be entirely automatically or mechanically accomplished while the truck or vehicle is on the track so as to avoid time and labor and the necessity of jacking up the vehicle.

The object of my invention is to provide a vehicle or truck which may be quickly adapted to be used in city streets in its pick up and delivery service, at which time the rubber tired wheels 12 are employed.

When this service has been performed, the truck is again driven to place where the track wheels 1—2 will engage with the railroad tracks and the truck operated at high speed on the railroad tracks between towns. In order to convert the truck from a street or highway type to the railroad track type, the wheel control mechanism is brought into operation so as to move it from the position shown in Figure 8 into the position shown in Figure 7, where the piston controlled levers 19, 19ª, 19ᵇ are about to engage with the pin controlling levers 18, 18ª, 18ᵇ; engagement of the levers being induced by upward movement of the piston P in cylinder C, which causes the wide or enlarged hook ends of these levers to interengage. This causes levers 18, 18ª, 18ᵇ to depress the spring controlled pins 9 and 9ª out of the groove 5ª in the extended hub of the track wheel, so that when piston P1 in cylinder C1 is forced outwardly the mechanism will be in the position shown in Figure 8, except that the highway wheel 12 will be suspended thereon as shown in Figure 4.

It will be understood that the wheel controlling mechanism is suitably supported from the frame or body of the car or truck proper. For example, the cylinder C1 is shown provided at one end with an attaching flange 37, having bolt holes 37ª to permit the cylinder to be bolted so as to project laterally from the body. The piston P1 carries the cylinder C by suitable means as at 38; and it also has rod 24 whereby the drum 20 is supported in place.

This rod is shown provided with a supporting bar 34 and reenforcing member 36; the end of bar 34 having a roller 35 which is adapted to ride on suitable supports, as indicated in Figure 7, on 33, 32 and 31; the latter being shown secured to the non-rotating disc portion of brake drum D. Guide bar 34 also acts as a gauge rod to prohibit the lifting mechanism from going down too far; the frame member 33 maintaining a fixed position relative to the wheel axle regardless of the extent to which the truck springs may have been compressed. At 39, 40, 41, I show a frame which may be secured to the truck side and may consist of a pair of similar frame members arranged in parallel relation, as shown in Figure 5, so as to permit the cylinder C to pass therebetween; the opposite sides of the cylinder being shown provided with rollers 43, 43ª which are adapted to travel on the lower frame members 41 and 41ª, which are shown in the nature of angle bars.

When the highway wheels are not in use, it is the purpose of my invention that these wheels be held completely out of the way where contact with equipment along the right-of-way is impossible; and at the same time it would be advisable to support these wheels by means other than the piston controlled mechanism heretofore described. I, therefore, propose mounting wheel supporting members at suitable places on the sides of the truck body as seen in Figure 12, where the highway wheel is shown placed onto the supporting member which is exemplified in the nature of a two-part spindle 48, 48ª shown in Figure 11; one end of each part being flanged as at 44, 45 and having bolt-holes as at 44ª and 45ª.

This two-part spindle is provided with the circumferential groove 46 which is adapted to receive the ends of the spring controlled pins 9, 9ª, as shown in Figure 12. The spindle is shown as preferably composed of two parts 48, 48ª spaced apart as shown in order to permit free travel of the gauge rods 34, during the lowering and raising of the wheels.

In Figures 13 to 16, I have more or less schematically illustrated an arrangement of compressed air or hydraulically operated mechanism adapted for the purpose; the mechanism being connected with some suitable source of air or fluid under pressure by means of conduit I which leads to the valve housing 53 which is provided with a partition 52 arranged in spaced relation with the bottom of the shell and therefore above the inlet I. The partition is shown with spaced apart ports 51 whereby the pressure medium is admitted to the upper chamber 50, in which a disc valve R is rotatably mounted on the partition and controlled by handle H. The partition is provided with tubes 55 and 56 and with tubes E.

It will be understood that a similar valve is intended in conjunction with each cylinder C and C1; and the tube 55 of each valve is connected with conduit 55ª extending to one end of the cylinder while the tube 56 connects with the conduit 56ª connected with the other end of the cylinder. The disc R is provided with prearranged ports as at 60, 62, 63 and 64 whereby the pressure medium may be selectively admitted to opposite ends of the cylinders and exhaustion from either end permitted.

For example, when ports 62 and 60 register with the tubes 55, 56, the pressure medium will pass into both conduits 55ª and 56ª and provide equal pressure on opposite sides of the piston-head. The ports are so arranged that when the valve is turned counterclockwise so that port 59 (see Figure 16) registers with tube 55, port 64 will register with tube 56 and with an exhaust tube E; and when port 61 is brought to register with tube 55, port 63 will register with tube 56 and reverse the operation of the piston; while at any intermediate positions the medium flow is cut off from conduits 55ª and 56ª.

The valve mechanism just described illustrates an arrangement that could be employed, but various methods or other suitable valves may be employed; the specific type of valve and arrangement not being claimed as a part of this invention which involves suitable track wheels and highway wheels adapted to be placed in supporting position or in operative relation with the track wheels, together with power controlled mechanism whereby the highway wheels will be automatically put into and out of operative relation with the track-wheels of the car or truck, with means associated with the hubs of the wheels whereby the two wheels will be automatically locked together. It will be understood, therefore, that I do not intend to limit the invention to the specific form disclosed as the invention may have expression in somewhat different form.

What I claim is:

1. In a vehicle of the character described, rail wheels; highway wheels adapted to be moved into parallel and operative relation with the rail wheels; means carried by the highway wheels whereby the highway wheels are automatically locked in said relation; means for operatively connecting the rail wheels and highway wheels; contractible gripping means adapted to release said first means and to carry the highway wheels into and out of said operative position; and power operated means for controlling said last means.

2. A vehicle of the character described provided with rail wheels having outwardly extended hubs; highway wheels adapted to slide onto said extended hubs and of diameter larger than the diameter of the rail wheels; means whereby the highway wheels are automatically locked on said hub-extensions; means whereby operative driving connection between the wheels is established; means carried by the vehicle and movable vertically and laterally, said means being adapted to release said first mentioned means and to convey the released highway wheel out of operative relation; and a controllable pressure medium supply for actuating said wheel releasing and conveying means.

3. In a vehicle of the character described provided with track wheels, at least certain of which are secured to the axles of the vehicle so as to rotate with the axles, all of said wheels having outwardly extended hubs; highway wheels having hubs adapted to fit onto the hubs of the track wheels and effect interengaging relation therewith; means whereby the highway wheels are automatically locked to the track wheels; pressure medium operated pistons secured to the vehicle body and provided with radially movable elements adapted to engage said first means and to carry the highway wheels into and out of position, said pistons being vertically disposed to move vertically and being arranged to be moved laterally, and means whereby the lateral movement of the pistons is effected.

4. In a vehicle of the character described having axles provided with track wheels, said wheels having outwardly extended hubs; highway wheels having hubs adapted to fit onto the hubs of the track wheels and effect interengaging relation therewith; means whereby the highway wheels are automatically locked to the track wheels; pressure medium receiving cylinders mounted on the vehicle, adapted to travel laterally, and provided with vertically movable pistons; a wheel-hub receiving drum movable with each piston and provided with radially movable elements controlled by said pistons and adapted to engage said first mentioned means and to carry the highway wheels into and out of position; means whereby said cylinders and their pistons are moved laterally; and means whereby the downward movement of the pistons is controlled by the spaced relation between the vehicle body and the axles.

5. In a vehicle of the character described, permanently secured track wheels; highway wheels adapted to move bodily into and out of parallel relation with the track wheels; spring controlled locking means carried by the highway wheels whereby the highway wheels are automatically locked in operative position, said means involving laterally disposed pivoted levers; contractible means adapted to engage said pivoted levers and to move said locking means out of locking position and to carry the highway wheels out of the operative relation with the track wheels; pressure medium operated means for actuating the contractible means and to move the same vertically; and means whereby the pressure medium operated means may be moved laterally.

6. In a vehicle of the character described, permanently secured track wheels, highway wheels adapted to move bodily into and out of parallel operative relation with the track wheels; vertically movable locking pins carried by the highway wheels whereby said wheels are locked in operative relation with the track wheels; fulcrumed levers carried by the highway wheels, said levers having a controlling relation with said locking pins; and power actuated means adapted to move into engagement with said fulcrumed levers so as to actuate the latter and thereby move the locking pins out of locking position, said fulcrumed levers constituting the means whereby the highway wheels are carried by said power actuated means.

7. In a vehicle of the character described, permanently secured track wheels provided with extended hubs; highway wheels adapted to slide onto the extended hubs and effect interlocking relation with the track wheels, spring controlled locking pins carried by the highway wheels adapted to engage with the extended hubs and thereby lock the highway wheels in operative position, tiltable means carried by the highway wheels and having controlling relation with the locking pins whereby the latter are moved out of locking position when said tiltable means are actuated; and power actuated means adapted to engage with the tiltable means to actuate the latter and to effect highway wheel carrying relation.

8. A highway-rail vehicle comprising, in combination with the body and its running gear, track wheels provided with extended hubs; highway wheels provided with hubs adapted to telescope with the hubs of the track wheels; interengaging means whereby the two wheels will revolve together; locking means whereby the two wheels are held in juxtaposed position and the highway wheel locked against lateral movement; levers pivotally mounted in the hubs of the highway wheels for controlling said locking means; laterally and vertically movable means adapted to engage said levers to move them into locking means releasing position and to carry the highway wheels; pressure medium operated pistons operatively connected with said last mentioned means whereby said means may be moved laterally to engage said levers, release the highway wheels and convey them laterally out of operative relation with the track wheels and then move them vertically above the plane of the track wheels.

9. A highway-rail vehicle comprising rail running wheels provided with extended hubs on their outer sides; highway wheels provided with hubs adapted to slide onto said extended hubs; spring controlled radially movable elements mounted on the highway wheels for effecting locking engagement with the extended hubs; pivoted levers carried by the highway wheels and operatively associated with said elements whereby the latter may be moved out of locking engagement with the hubs of the rail wheels; highway wheel carrier means involving levers adapted to effect holding engagement with said pivoted levers and to actuate the latter into spring elements releasing position; and pressure medium operated pistons operatively connected with the carrier means, certain of the pistons causing the carrier means to move laterally while the other pistons cause the carrier to move vertically into and out of axial alignment with the rail running wheels.

10. In a vehicle of the character described, provided with axles; rail wheels secured on the axles; highway wheels adapted to be disposed adjacent to the rail wheels; means whereby the highway wheels are automatically locked adjacent to the rail wheels and in operative position; means adapted to release said first means, effect holding relation therewith and thereby carry the highway wheels; pressure medium operated pistons whereby the last mentioned means may be moved vertically into and out of axial alignment with the rail wheels; and pressure medium operated pistons whereby said first pistons may be moved laterally and the highway wheels carried to and away from the rail wheels.

11. In a vehicle of the character described including a flanged rail wheel fixedly secured to a journal; a highway wheel adapted to be slid into concentric relation with the journal; means for effecting interengaging relation between the two wheels; means carried by the highway wheel for automatically locking said wheel in place; power actuated means mounted on the side of the vehicle to move vertically and laterally and provided with a contractible portion adapted to engage said first means to move same out of locking condition and to carry said highway wheel out of operative position.

12. In a vehicle of the character described including a flanged rail wheel fixedly secured to a journal; a highway wheel adapted to be slid into concentric relation with the hub of the rail wheel and to effect driving relation therewith; means carried by the highway wheel for automatically locking said wheel in place and involving laterally disposed pivoted levers; power actuated means mounted on the side of the vehicle to move vertically and laterally and involving a contractible portion adapted to engage said pivoted levers and move the first mentioned means out of locking condition and to carry the highway wheel laterally and then vertically; a dummy hub fixedly secured to the vehicle side adapted to receive the highway wheel from said contractible portion, said dummy hub having surfaces with which the locking means on the highway wheel automatically engage for locking said wheel in inoperative position.

13. In a vehicle of the character described, rail wheels permanently mounted on the ends of a journal and having laterally extended hubs provided with annular grooves; highway wheels adapted to be disposed adjacent the rail wheels, the highway wheels having hubs adapted to fit onto the hubs of the rail wheels; spring controlled radially movable pins carried by the highway wheels and adapted to engage the grooves in the rail wheel hubs and thereby lock the highway wheels on the hubs of the rail wheels; interengaging surfaces on the hubs of the two wheels whereby a power transmitting relation between the rail and highway wheels is effected when the latter wheels are locked in said position; power operated means mounted on the side of the vehicle and adapted to engage with and to release said spring-controlled pins and to carry the highway wheels laterally and thence upwardly into and out of operative relation with the rail wheels.

14. In a vehicle of the character described, rail wheels provided with extended hubs having annular grooves, highway wheels having hubs adapted to slide onto said hub extensions; radially movable means mounted in the hubs of the highway wheels and adapted to engage in the grooves in the hubs of the rail wheels whereby said highway wheels are automatically locked on the hub extension of the rail wheels; interengaging surfaces on the hubs of both wheels whereby the rail wheels and the highway wheels are operatively connected to rotate together; and means arranged on the sides of the vehicle adapted to move said first means radially outward from the grooves in the extended hubs of the rail wheels and to effect holding relation with the hubs of the highway wheels, said means being adapted to move laterally and thereby slide the highway wheels off the hub extensions out of operative position and then move vertically upward adjacent the side of the vehicle.

15. In a vehicle of the character described provided with axles; rail wheels secured on the axles; highway wheels adapted to be disposed adjacent the rail wheels; means whereby the highway wheels are automatically locked in operative relation with the rail wheels; laterally and vertically movable means comprising a portion adapted to release said first means and effect locking engagement therewith and a second portion adapted to effect holding engagement with the hubs of the highway wheels; pressure medium operated means mounted on the side of the vehicle and operatively connected with said last mentioned means whereby the latter with the highway wheels may be moved laterally and thence vertically adjacent the side of the vehicle.

16. In a vehicle of the character described provided with axles; rail wheels secured on the axles; highway wheels adapted to move into co-axial relation with the rail wheels and to be driven by said wheels; automatic means mounted in the hubs of the highway wheels for locking the highway wheels to the rail wheels; gear elements on the hubs of the rail wheels and the hubs of the highway wheels adapted to mesh laterally to effect a driving relation between said wheels; and pressure medium operated means whereby the automatic means is moved into highway wheel releasing position, the highway wheels dissociated from the rail wheels and moved upwardly against the sides of the vehicle.

JOHN HUGH ADAIR.